United States Patent [19]

Vis

[11] Patent Number: 4,825,898

[45] Date of Patent: May 2, 1989

[54] TAMPER PREVENTION DEVICE FOR FIRE HYDRANTS

[76] Inventor: Arthur D. Vis, 28424 Universal, Warren, Mich. 48092

[21] Appl. No.: 232,120

[22] Filed: Aug. 15, 1988

[51] Int. Cl.⁴ .......................... F16K 35/06; E03B 9/06
[52] U.S. Cl. ..................................... 137/296; 137/382; 137/800; 220/85 P; 220/284; 251/291
[58] Field of Search ........... 137/296, 377, 382, 382.5, 137/800; 220/85 P, 284; 251/291

[56] References Cited

U.S. PATENT DOCUMENTS

| | | | |
|---|---|---|---|
| 2,576,631 | 11/1951 | Mueller | 137/296 |
| 2,762,386 | 9/1956 | Fogle | 137/296 |
| 3,623,498 | 11/1971 | Manahan et al. | 137/296 |
| 4,033,372 | 7/1977 | Bowman | 137/296 |
| 4,379,469 | 4/1983 | Britz | 137/296 |
| 4,484,595 | 11/1984 | Vanek et al. | 137/800 |
| 4,526,193 | 7/1985 | Drach | 137/800 |

*Primary Examiner*—George L. Walton
*Attorney, Agent, or Firm*—Krass & Young

[57] ABSTRACT

A protective device for fire hydrants comprises a generally domed shaped member having a shape conforming to the bonnet of a fire hydrant and including a socket configured to receive an operating nut thereof. The protective device has a diameter too great to be engaged by readily available pliers, wrenches and the like but may be actuated by use of a chain wrench or a friction wrench. The device includes no separate moving parts which may freeze or jam and may be retrofitted to existing fire hydrants by welding or brazing.

11 Claims, 2 Drawing Sheets

TAMPER PREVENTION DEVICE FOR FIRE HYDRANTS

FIELD OF THE INVENTION

This invention relates generally to fire hydrants and more particularly to devices for preventing unauthorized use of fire hydrants Specifically, the invention relates to a tamper preventing cover for the operating nut and/or outlet caps of a fire hydrant.

BACKGROUND OF THE INVENTION

Fire hydrants have been in widespread use for many years now and are of vital importance to public safety, particularly in urban situations. It is important that a fire hydrant be simple to operate and be capable of swiftly delivering large volumes of water.

From their earliest inception, fire hydrants have suffered problems of tampering, vandalism or other unauthorized use. In hot weather it is not uncommon for children to open a fire hydrant in play. In some instances, persons have made unauthorized use of fire hydrants for purposes of stealing water to fill swimming pools, irrigate fields and the like. In yet other instances, fire hydrants have been opened for purposes of vandalism.

Such unauthorized use of fire hydrants presents various problems. The most obvious is a loss of water and water pressure which can hamper both fire fighting efforts and consumer uses. In many instances water from open fire hydrants has caused serious damage to vehicles and nearby buildings.

Unauthorized use can also damage the fire hydrants as well as equipment using those hydrants. Removal of the outlet caps can allow various debris to enter the fire hydrant and such debris can subsequently damage pumps or plug hoses in fire fighting equipment. In some instances unauthorized tampering with a fire hydrant can leave residual water therein which, if not removed before cold weather, can freeze and damage the hydrant or at least prevent the flow of water therefrom.

Quite obviously, the unauthorized use of fire hydrants presents many problems and for this reason numerous approaches have been developed to prevent such tampering. Fairly soon after their introduction, it became standard to provide fire hydrants with a pentagonal operating nut. Since a nut of this type does not have a pair of parallel sides, it is difficult to turn with conventionally available wrenches. While the use of a pentagonal nut does eliminate some tampering, nuts of this type can be readily actuated with pipe wrenches, locking pliers or similar gripping tools and for this reason various solutions have been implemented to further confound the unauthorized use of fire hydrants. In some instances, fire hydrants are provided with a recessed operating nut which can only be turned by the use of an appropriate socket wrench. Such recessed nut arrangements are shown in U.S. Pat. Nos. 4,369,807 and 4,379,469. Fire hydrant protectors of this type can present problems insofar as the recessed cavity can trap moisture, dirt or other such debris and can freeze up or plug up, preventing swift and reliable fire hydrant actuation.

In some instances, fire hydrants are provided with special operating nuts not amenable to turning by pipe wrenches or locking pliers. U.S. Pat. No. 4,554,944 shows a pentagonal operating nut having upwardly tapering sides whereas U.S. Pat. No. 4,356,839 shows a bullet-shaped operating nut. Both of the aforementioned nuts must be utilized in conjunction with particularly designed wrenches. Such specially configured nuts do prevent unauthorized hydrant use, but their use requires disassembly and retrofitting of presently employed fire hydrants.

Another approach to tamper protection involves covering the operating nut with a protective cap or cover. For example, U.S. Pat. No. 3,623,498 shows one such cover which is affixed by bolting and removed by use of bolt cutters. Another hydrant cover is shown in U.S. Pat. No. 4,182,361. The cover of this patent can only be removed by the use of a special tool. The main problem with the use of such nut covers is that their removal entails a time delay. U.S. Pat. No. 4,033,372 details a similar approach wherein a hydrant includes a replacement bonnet disposed to actuate the operating nut while presenting a smooth outer hydrant surface actuatable only with a specialized wrench which engages recesses on the bonnet. It should be noted that this device requires disassembly of the top bonnet of the fire hydrant and its replacement with the protective device.

It should be clear that there is needed a device for the prevention of fire hydrant tampering which device is simple to install, use and maintain and which is not prone to jamming by freezing or accumulation of debris. The present invention provides a protective cover for fire hydrants which may be simply welded onto pre-existing actuating nuts and outlet covers without the need for any disassembly. The cover of the present invention includes no separate moving parts which could jam or freeze. It is low in cost and reliable. These and other features of the present invention will be readily apparent from the drawings, discussion and claims which follow.

BRIEF DESCRIPTION OF THE INVENTION

There is disclosed herein a protective device for preventing the unauthorized use of a fire hydrant. The device comprises a generally domed-shaped cover configured to overlie and correspond to at least a portion of a bonnet of the fire hydrant. The cover includes a socket configured to receive and retain an operating nut of the hydrant and to thereby affix the cover to the hydrant. Rotation of the cover effects rotation of the operating nut. The socket of the cover may be affixed to the nut by various techniques such as welding, brazing or adhesive affixation.

It is preferred in one embodiment that the domed-shaped cover have a circular perimeter and is more particularly preferred that the cover is configured so that when affixed to the hydrant the dome thereof overlies and corresponds to the contour of the bonnet and the perimeter thereof is sufficiently close to the bonnet so that a clearance of less than one inch and preferably about one-quarter inch exists therebetween. The circular perimeter of the device may be configured so as to be engageable by a friction wrench.

The device may be adapted for mounting upon the upper bonnet of the fire hydrant so as to protect the flow actuating nut, or it may be adapted for mounting upon the bonnet of an outlet cover so as to prevent unauthorized removal thereof. The cover may be fabricated from a variety of materials including iron, steel, aluminum, brass, bronze, synthetic polymeric materials and combinations thereof. In order to adapt the cover to a variety of configurations of fire hydrant the device may include an adapter ring which is interposed between the fire hydrant bonnet and the protective cover.

DETAILED DESCRIPTION OF THE INVENTION

Figure 1:
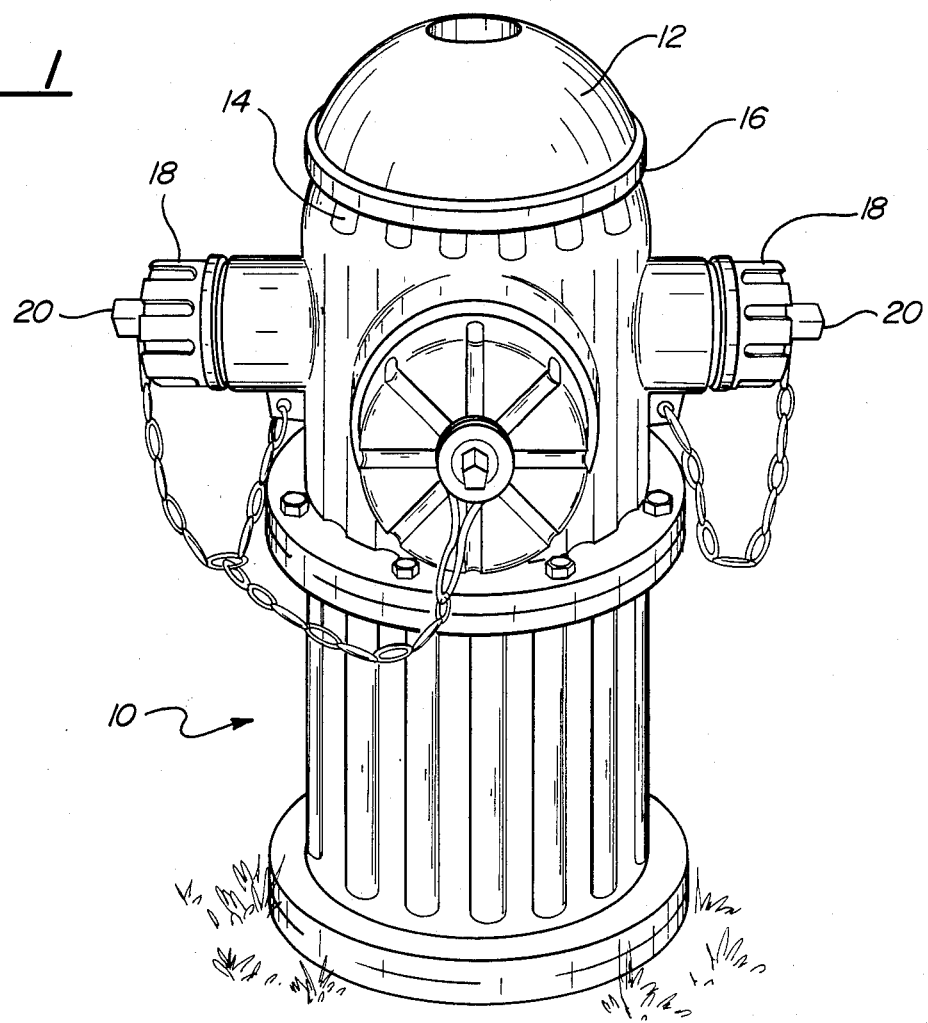
FIG. 1 is a perspective view of a fire hydrant fitted with one embodiment of protective device structured in accord with the principles of the present invention.

Referring now to FIG. 1, there is shown a fire hydrant 10 of conventional design having a water saver protective device 12 affixed thereto. The protector 12 covers, and conforms to at least a portion of the upper bonnet 14 of the hydrant 10 and in so doing shields the flow actuating operating nut of the hydrant (not visible in this view) from tampering. As will be explained in greater detail hereinbelow, the protective device 12 is welded to the operating nut and rotation of the protective device 12 rotates the operating nut to control the flow of water from the hydrant 10.

The protector 12 is configured such that when installed, the outer rim 16 thereof is sufficiently close to the upper bonnet 14 of the fire hydrant 10 to prevent insertion of a hand therebetween. The protector 12 provides a surface too large to be gripped by conventionally available pipe wrenches, locking pliers, and the like. It is also important that the protector 12 be of sufficiently small diameter to prevent its ready use as a wheel for manual actuation of the operating nut. It has generally been found that a diameter of 6–12 inches provides sufficient protection without allowing for ready manual actuation.

In the event that authorized personnel need to operate the fire hydrant 10, they may simply do so by use of a friction wrench or chain wrench for engaging the rim 16 of the protector 12. Such wrenches are presently available commercially and are quick and simple to use. However, they are not generally found in most home tool kits and hence generally not available to potential vandals.

Figure 4:
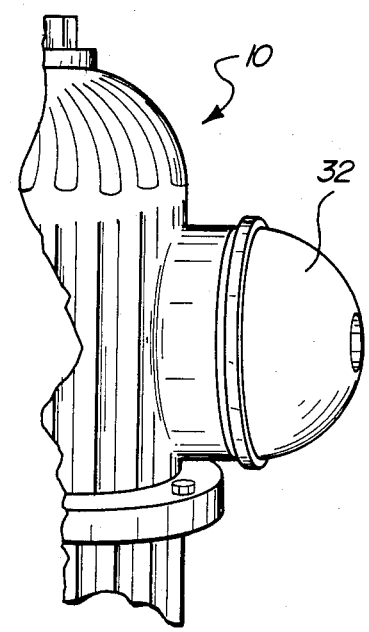
FIG. 4 is a perspective view of a portion of a fire hydrant depicting yet another embodiment of the protective device of the present invention as adapted for use with an outlet cap of the hydrant.

It should be noted that the protector 12 is shown as affixed to the upper bonnet 14 of the hydrant 10 however a similar protector may be utilized in combination with the outlet caps 18 of the hydrant by simple affixation of an appropriately sized device to the bonnet portions thereof. In this context it will be noted that the term "bonnet" as applied to fire hydrants will refer to the portions thereof terminating in an operating nut and as such may refer to the upper bonnet which terminates in the flow actuating nut or to the particularly configured portion of the outlet caps 18 bearing operating nuts 20 thereupon. Likewise, "operating nut" will generically refer to any actuating nut associated with the bonnet. Such operating cap modification is shown in FIG. 4 and will be discussed in greater detail with reference thereto.

Figure 2A:
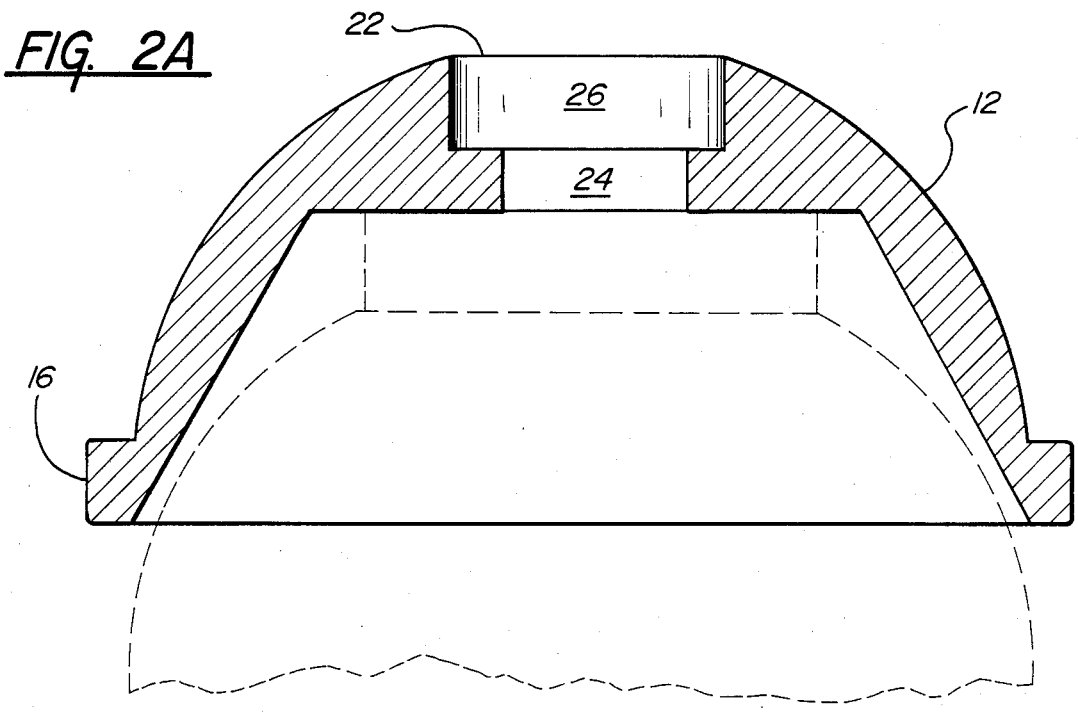
FIG. 2A is an elevational view in cross section of one fire hydrant protector of the present invention.

Referring now to FIG. 2A there is shown a cross section of one particular protective device 12 structured in accord with the principles of the present invention. The device 12 of FIG. 2A presents a generally rounded exterior configuration terminating in a peripheral rim 16 which may be preferably configured to a square cross section to allow for gripping by a friction or chain wrench. The protector 12 includes a central socket 22 configured to receive the operating nut of a fire hydrant. Shown in FIG. 2A is a phantom outline of the upper bonnet portion 14 of a fire hydrant depicting the relationship thereof to the protector 12 and it will be noted that clearance therebetween proximate the rim portion is relative small. In use, the protector 12 is fitted onto the operating nut of a fire hydrant and affixed thereto as for example by welding. In this regard, it will be noted that the socket 22 includes a relatively narrow portion 24 particularly configured to receive the operating nut and a relatively wider portion 26 allowing clearance thereabout for purposes of effecting the weld or other attachment. In this context it should be noted that attachment may also be accomplished by brazing, adhesives, cements and similar materials or by mechanical affixation as by screwing, clamping and the like.

Figure 2B:
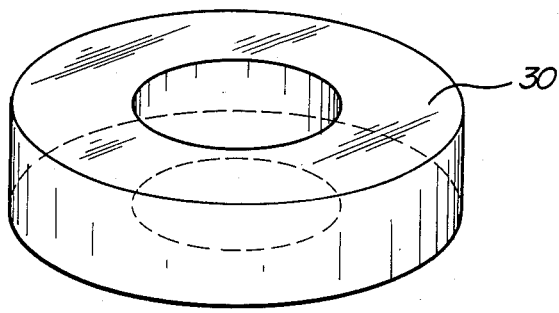
FIG. 2B is a perspective view of an adapter ring which in some instances is used in conjunction with the protective device.

Fire hydrants are of a number of different configurations. The vast majority include an upper collar surrounding the flow actuating nut and it is generally preferred that the protector 12 will be configured to allow for such a collar. In some instances the hydrant does not include a collar and it may be found advantageous to supply an adapter ring such as that shown at 30, in FIG. 2B. In such instance, the adapter ring 30 is fitted onto the upper bonnet and about the flow actuating nut of the hydrant. The adapter ring 30 serves to ensure proper fit of the protector 12 onto the upper bonnet 14 of the hydrant. Obviously, other shapes of adapter may be similarly employed to accommodate various other hydrant configurations. Likewise, the protector itself 12 may be made in configurations other than that specifically depicted herein.

Figure 3:
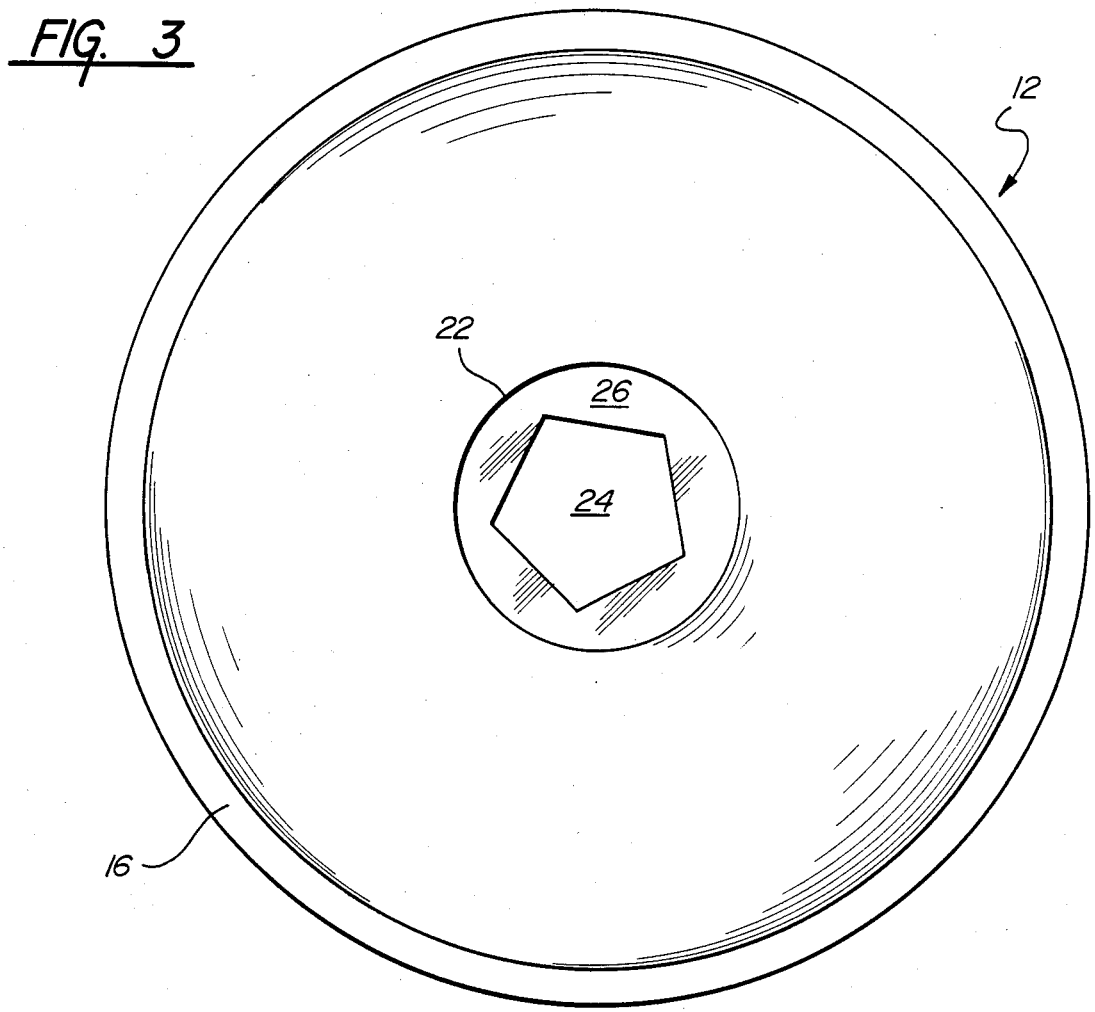
FIG. 3 is a top plan view of the protective cover of FIG. 2.

Referring now to FIG. 3 there is shown a top plan view of the protector 12 of FIG. 2A showing in better detail the socket 22 including the portions 24 adapted to receive the operating nut and the larger opening 26. Also clearly visible is the rim 16.

Referring now to FIG. 4, there is shown a perspective view of a portion of a fire hydrant 10 as previously described and illustrating herein another embodiment of the present invention designed to protect the outlet cap of the hydrant 10 from unauthorized opening. By so protecting the outlet, damage occasioned by accumulation of the debris therein is prevented and furthermore an incentive for initiating water flow is removed. In the illustrated embodiment, the outlet cup is provided with a protective device 32 configured to fit the contour of the bonnet thereof and protect the outlet cap fastening nut. The protective device 32 of FIG. 4 is generally similar in shape to that illustrated with reference 2A and includes a socket configured to receive the fastening nut.

The protective device of the present invention may, as previously noted, be manufactured in various configurations depending upon the particular design of fire hydrant utilized. The device should include a socket configured to receive the operating nut of the fire hydrant although it will be appreciated that the particular socket design may deviate somewhat from that shown herein. The protective device should be configured so as to conform to the bonnet portion of the fire hydrant so as to substantially prevent insertion of the hand between that bonnet and the device, and it has generally been found that a clearance of no more than one inch and preferably about one-quarter inch will so suffice.

There are a great many materials which may be utilized to manufacture the protective device, and it generally is most expedient to utilize simple metal castings manufactured from ferrous materials such as iron and steel. Similarly, nonferrous materials such as aluminum, brass, bronze and the like may be employed. The protective devices of the present invention may also be manufactured by stamping, machining or other forming processes and may also be manufactured from non-metallic materials, particularly organic polymers.

In accord with the criteria described herein it will be appreciated that there are a greater variety of protective devices for fire hydrants which may be manufactured. It will also be appreciated that protective devices of this type may be utilized to protect operating nuts other than those associated with fire hydrants. Therefore, it should be apparent that there are a great many variations of the present invention possible within the scope of the teaching herein, all of which are encompassed by the present invention. Accordingly, the foregoing drawings, discussion and description are merely meant to illustrate particular embodiments of the invention and are not meant to be limitations upon the practice thereof. It is the following claims, including all equivalents which define the scope of the present invention.

I claim:

1. A protective device for preventing unauthorized use of a fire hydrant comprising:

a cover having a generally dome-shaped exterior surface and an interior surface configured to overlie at least a portion of the bonnet of the fire hydrant; said cover including a single, centrally disposed aperture therethrough passing between said surfaces and having two portions of different diameters, the first portion disposed most proximate the interior surface of the cover and configured to correspond to the cross-section of the hydrant operating nut and to allow a portion of the nut to pass therethrough so that a length of the nut projects into the second portion, said second portion disposed proximate the exterior surface and having a diameter greater than the diameter of the first portion so that a space is defined between the interior perimeter of the second portion and the length of operating nut projecting thereinto, said space sufficient to allow a liquid attachment material to be disposed therein, said attachment material hardenable after a period of time so as to permanently affix the cover to the operating nut; whereby rotation of the cover, so as to effect rotation of the operating nut is accomplished only with a special tool which engages the outer perimeter of the cover.

2. A device as in claim 1, wherein said dome-shaped cover has a circular perimeter.

3. A device as in claim 2, wherein said cover is configured so that when affixed to the hydrant, the lower surface overlies and corresponds to the contour of the bonnet and the perimeter thereof is sufficiently close to the bonnet so that a clearance of approximately one-quarter inch exists therebetween.

4. A device as in claim 2 wherein the circular perimeter is configured so as to be engageable by a friction wrench.

5. A device as in claim 1, wherein said cover is configured to receive and retain the operating nut associated with the outlet cover of the hydrant and wherein said cover has a shape corresponding generally to a portion of the bonnet of the outlet cap.

6. A device as in claim 1, wherein said cover is fabricated from a material consisting essentially of: iron, steel, aluminum, brass, bronze, synthetic polymeric materials and combinations thereof.

7. A device as in claim 1, further including an adapter member configured to surround the operating nut and to be interposed between the cover and the bonnet, whereby the positional relationship therebetween may be adjusted.

8. A device as in claim 1, wherein said liquid attachment material comprises molten metal derived from a welding process.

9. A device as in claim 1, wherein said liquid attachment material comprises a molten metal derived from a brazing process.

10. A device as in claim 1, wherein said liquid attachment material comprises a molten metal derived from a soldering process.

11. A device as in claim 1, wherein said liquid attachment material comprises an adhesive.

* * * * *